US011491942B2

(12) United States Patent
Angermayer et al.

(10) Patent No.: US 11,491,942 B2
(45) Date of Patent: Nov. 8, 2022

(54) MARKING OBJECT ARRANGEABLE AT A CHILD SEAT FOR ADAPTIVE ACTUATION OF AN AIRBAG, METHOD TO DETERMINE A POSITION AND/OR ORIENTATION OF A CHILD SEAT RELATIVE TO A CAR SEAT AND COMPUTER PROGRAM FOR ADAPTIVE ACTUATION OF AN AIRBAG

(71) Applicant: ZF Friedrichshafen AG, Friedrichshafen (DE)

(72) Inventors: Jörg Angermayer, Friedrichshafen (DE); Vincent Choquet, Friedrichshafen (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 337 days.

(21) Appl. No.: 16/803,224

(22) Filed: Feb. 27, 2020

(65) Prior Publication Data

US 2020/0269795 A1    Aug. 27, 2020

(30) Foreign Application Priority Data

Feb. 27, 2019  (DE) ................... 10 2019 202 636.2

(51) Int. Cl.
*B60R 21/20* (2011.01)
*B60R 11/04* (2006.01)
(Continued)

(52) U.S. Cl.
CPC ........ *B60R 21/01556* (2014.10); *B60R 11/04* (2013.01); *B60R 21/20* (2013.01);
(Continued)

(58) Field of Classification Search
CPC ............ B60N 2/002; B60N 2002/0272; B60R 21/01534
(Continued)

(56) References Cited

U.S. PATENT DOCUMENTS 7,376,248 B2 * 5/2008 Ertl ................... B60R 21/01538
382/104
7,663,502 B2 * 2/2010 Breed .................. G08B 29/181
340/7.29

(Continued)

FOREIGN PATENT DOCUMENTS

CN    110612559 A   * 12/2019   ........... B62B 3/1404
CN    111788101 B   *  6/2021   ............. B60K 28/04
(Continued)

OTHER PUBLICATIONS

"Sensor Technologies for Intelligent Transportation Systems" by Juan Guerrero-Ibáñez et al.; Sensors 2018, 18(4), 1212; https://doi.org/10.3390/s18041212 (Year: 2018).*
(Continued)

*Primary Examiner* — Cuong H Nguyen
(74) *Attorney, Agent, or Firm* — Crowell & Morring LLP

(57) ABSTRACT

The invention relates to a marking object that can be placed on a vehicle child seat for adaptive actuation of an airbag, which is configured to reflect electromagnetic radiation and mark a position and/or orientation of the vehicle child seat in relation to a vehicle seat for an imaging sensor based on the reflection, in order to actuate the airbag depending on the position and/or orientation of the vehicle child seat, wherein the marking object is a Quick Response code, radar reflector, lidar reflector, or infrared reflector. The invention also relates to a vehicle child seat, a method for determining a position and/or orientation of a vehicle child seat in relation to a vehicle seat, and interior monitoring system, a computer program for adaptive actuation of an airbag and a computer readable data carrier.

10 Claims, 1 Drawing Sheet

(51) Int. Cl.
*B60R 21/015* (2006.01)
*G01S 17/42* (2006.01)
*B60R 21/01* (2006.01)
*G01S 13/42* (2006.01)
*B60R 11/00* (2006.01)

(52) U.S. Cl.
CPC .............. *B60R 2011/0003* (2013.01); *B60R 2021/01286* (2013.01); *G01S 13/42* (2013.01); *G01S 17/42* (2013.01)

(58) Field of Classification Search
USPC .............................. 701/45, 49; 340/426.22
See application file for complete search history.

(56) References Cited

U.S. PATENT DOCUMENTS

| | | | | |
|---|---|---|---|---|
| 7,671,851 | B1* | 3/2010 | Pryor | G06F 3/0312 345/184 |
| 9,290,153 | B2* | 3/2016 | Ricci | B60K 35/00 |
| 2008/0129475 | A1* | 6/2008 | Breed | B60R 21/01538 701/45 |
| 2014/0309880 | A1* | 10/2014 | Ricci | G06F 16/24575 701/1 |
| 2014/0309886 | A1* | 10/2014 | Ricci | G08G 1/096741 701/41 |
| 2014/0310594 | A1* | 10/2014 | Ricci | G06Q 30/0641 715/702 |
| 2014/0310610 | A1* | 10/2014 | Ricci | H04W 4/80 715/744 |
| 2014/0310739 | A1* | 10/2014 | Ricci | G06F 21/31 725/75 |

FOREIGN PATENT DOCUMENTS

| | | | | |
|---|---|---|---|---|
| CN | 113287029 A * | 8/2021 | | G01C 17/38 |
| DE | 196 38 458 C1 | 1/1998 | | |
| DE | 10063697 A1 * | 7/2002 | | B60R 21/01538 |
| DE | 102016105183 A1 * | 9/2016 | | G06Q 10/087 |
| EP | 0 603 733 A1 | 6/1994 | | |
| EP | 0 672 994 A1 | 9/1995 | | |
| EP | 1339570 B1 * | 2/2005 | | B60N 2/002 |
| WO | WO 02/046003 A1 | 6/2002 | | |
| WO | WO-0246003 A1 * | 6/2002 | | B60N 2/002 |

OTHER PUBLICATIONS

W. J. Fleming, "Overview of automotive sensors," in IEEE Sensors Journal, vol. 1, No. 4, pp. 296-308, Dec. 2001, doi: 10.1109/7361.983469. (Year: 2001).*

S. Taghvaeeyan and R. Rajamani, "Two-Dimensional Sensor System for Automotive Crash Prediction," in IEEE Transactions on Intelligent Transportation Systems, vol. 15, No. 1, pp. 178-190, Feb. 2014, doi: 10.1109/TITS.2013.2279951. (Year: 2014).*

D. M. Mothershed et al., "Comparison and Evaluation of Algorithms for LiDAR-Based Contour Estimation in Integrated Vehicle Safety," in IEEE Transactions on Intelligent Transportation Systems, doi: 10.1109/TITS.2020.3044753. (Year: 2020).*

W. J. Fleming, "New Automotive Sensors—A Review," in IEEE Sensors Journal, vol. 8, No. 11, pp. 1900-1921, Nov. 2008, doi: 10.1109/JSEN.2008.2006452 (Year: 2008).*

Wang Hong-yan et al., "Automobile Driver Posture Monitoring Systems: A Review" China Journal of Highway and Transport, 2019 (02): 1-18 (Year: 2019).*

M. Tonnis, R. Lindl, L. Walchshausl and G. Klinker, "Visualization of Spatial Sensor Data in the Context of Automotive Environment Perception Systems," 2007 6th IEEE and ACM International Symposium on Mixed and Augmented Reality, 2007, pp. 115-124, doi: 10.1109/ISMAR.2007.4538835 (Year: 2007).*

German Office Action for related German Application No. 10 2019 202 636.2, dated Sep. 2, 2019, 6 pgs.

* cited by examiner

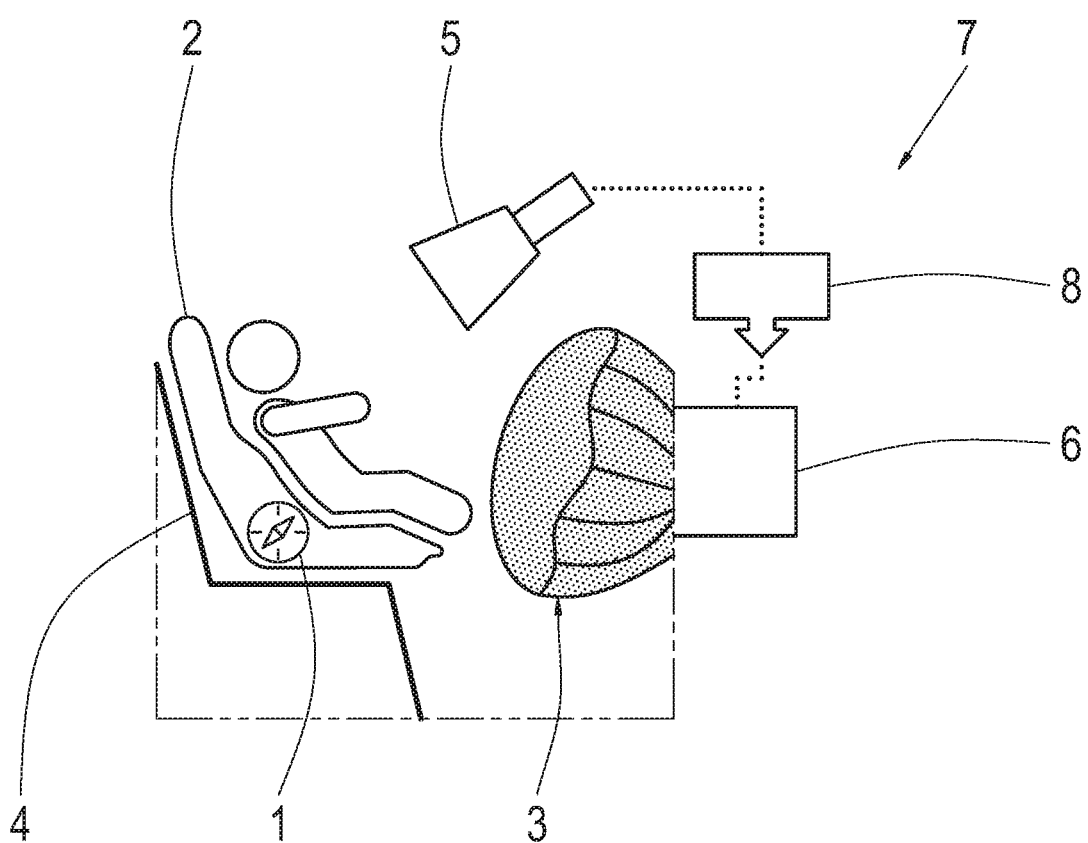

MARKING OBJECT ARRANGEABLE AT A CHILD SEAT FOR ADAPTIVE ACTUATION OF AN AIRBAG, METHOD TO DETERMINE A POSITION AND/OR ORIENTATION OF A CHILD SEAT RELATIVE TO A CAR SEAT AND COMPUTER PROGRAM FOR ADAPTIVE ACTUATION OF AN AIRBAG

CROSS-REFERENCE TO RELATED APPLICATIONS

This application claims priority from German Application No. 10 2019 202 636.2, filed on Feb. 27, 2019, the entirety of which is each hereby fully incorporated by reference herein.

The invention relates to a marking object that can be placed on a vehicle child seat for adaptive actuation of an airbag, a vehicle child seat that comprises such a marking object, a method for determining a position and/or orientation of a vehicle child seat in relation to a vehicle seat, an interior monitoring system, a computer program product for adaptive actuation of an airbag, an interior monitoring system, a computer program for adaptive actuation of an airbag, and a computer readable data carrier.

In the event of a collision, airbags in the vehicle or on its outer body, so-called outer airbags, are normally actuated. Safety ratings such as Euro NCAP require an adaptive actuation, for example. This also means, with respect to the entire content of this disclosure, the actuation of an airbag, in particular the actuation forces or volumes for deploying the airbag, should be adapted to conditions, including a suppression of the actuation if greater personal injury would occur as a result of the actuation. This is the case with child seats. For child seats facing away from the direction of travel on the front passenger seat, the airbags should be suppressed, for example. For child seats facing the direction of travel, the airbags should be adapted accordingly, depending on the type of child seat.

Airbags for the front passenger seat can currently be suppressed manually. Furthermore, child seats can be detected with seat sensors. Moreover, EP 0 603 733 A1, for example, discloses a sensor for detecting a child seat that is attached to the child seat. DE 196 38 458 C1 discloses a sensor for child seat detection located in or on a seatbelt buckle.

The object of the invention is to improve child seat detection.

The marking object according to the invention can be placed on a vehicle child seat for adaptive actuation of an airbag. The marking object achieves this object in that it is configured to reflect electromagnetic radiation and to mark a position and/or orientation of the vehicle child seat in relation to a vehicle seat for an imaging sensor based on the reflection. An airbag can be actuated depending on the position and/or orientation of the vehicle child seat. According to the invention, the marking object is a Quick Response code, radar reflector, lidar reflector, or an infrared reflector.

The marking object can be glued, for example, to an outer surface or an inner surface of the vehicle child seat, in particular as a retrofitting solution. Alternatively, the marking object can be integrated in the vehicle child seat. The marking object is dimensioned accordingly, such that it can be placed as inconspicuously as possible on the vehicle child seat. The marking object is preferably a highly reflective material in the respective wavelength spectrum, in the form of an adhesive tape or some other type of label. The marking object is therefore a passive element for vehicle child seat detection, and therefore less prone to malfunction and easier to produce than active elements such as transponders, antennas, or other sensors. The position and/or orientation of the vehicle child seat can be detected particularly reliably and with little effort with the marking object, in particular when the detection takes place via an interior monitoring system already existing in the vehicle. The orientation comprises, in particular, information regarding whether the child seat is installed facing toward or away from the direction of travel. In general, the orientation comprises information regarding how the vehicle child seat is oriented in the interior of a vehicle. In particular, it is also possible to detect whether or not there is a vehicle child seat with the marking object. If there is a vehicle child seat, the marking object marks its relative orientation to a vehicle seat. In certain cases, an airbag is not deployed. By way of example, a first marking object can be placed on a front surface of the vehicle child seat, and a second marking object can be placed on the back surface. If a vehicle child seat is installed facing the direction of travel, the first marking object can be detected, and is thus marked, e.g. with an upper case "F" for front, to indicate that the vehicle child seat is facing the direction of travel. If the vehicle child seat is installed facing away from the direction of travel, the second marking object can be detected, and is thus marked, e.g. with an upper case "B" for back, to indicate that the vehicle child seat is facing away from the direction of travel. In a similar manner, the marking object, or numerous marking objects, can indicate the position of the vehicle child seat.

A vehicle child seat is a child seat for a vehicle. Vehicles are passenger cars or special vehicles, e.g. people movers. An airplane or ship is also a vehicle. The vehicle child seat can preferably be attached at all positions in a vehicle interior, in particular on a front passenger seat in a passenger car, facing toward or away from the direction of travel, with or without a booster seat. The vehicle child seat can be attached, e.g. via an adult seatbelt, and/or the vehicle child seat is suitable for use with ISOFIX systems. The vehicle child seat is designed for various weight classes, e.g. less than 13 kg, 9-18 kg, 15-25 kg, and 22-36 kg. The vehicle child seat is also designed for various body sizes, e.g. shorter than 60 cm, 60-75 cm, 75-87 cm, 87-105 cm, 105-125 cm and taller than 125 cm. This also includes infant carriers.

A vehicle seat is a front passenger seat, back passenger seat, or other passenger seat, for example.

Airbags are part of a damage control system, and normally comprise an inflatable bag, which is inflated in the case of an accident inside or outside the vehicle, in order to minimize personal injury. The airbag can be a front airbag, internal or external lateral airbag, head airbag, curtain airbag, chest airbag, or window airbag.

The imaging sensor is part of an interior monitoring system. The imaging sensor measures light, radar radiation and/or infrared radiation, reflected on actual objects in particular, in order to generate an image of the objects. The imaging sensor can be part of a corresponding camera that comprises a lighting unit corresponding to the respective measurement value with which the marking object is illuminated. Alternatively, the marking object can be illuminated by a separate lighting unit.

A Quick Response code, abbreviated QR code, such as that disclosed, e.g. in EP 0 672 994 A1, is a multidimensional code composed of various, preferably geometric, elements and spaces located therebetween, with the highest possible contrast. The position and/or orientation of the vehicle child seat can be encoded, e.g. in the form of a plane with a high density of information, such that they can be reliably detected. The QR code also provides data regarding the manufacturer, model, or dimensions of the vehicle child seat. The QR code can be visible in the visible range of the electromagnetic spectrum. Alternatively, the QR code may not be visible to the human eye, e.g. in the form of an infrared code.

The use of a vehicle child seat and its position and/or orientation are automatically and reliably detected with the marking object according to the invention. In particular for vehicle child seats facing away from the direction of travel, installed on a front passenger seat, the actuation of the front passenger airbags is automatically suppressed.

A further aspect of the invention is a vehicle child seat comprising a marking object according to the invention.

The method according to the invention serves to determine a position and/or orientation of a vehicle child seat in relation to a vehicle seat. A marking object according to the invention is first, or already, placed on the vehicle child seat. At least one interior imaging sensor detects the position and/or orientation of the vehicle child seat by means of the marking object. The detection is sent to a control unit for an airbag. The control unit actuates the airbag depending on the position and/or orientation of the vehicle child seat. This also means in particular, that the control unit may not actuate the airbag, depending on the position and/or orientation of the vehicle child seat.

A control unit prepares the data from sensors as input signals, processes these by means of a computer, e.g. a computer platform, and outputs logic and/or power levels as regulating or control signals. Actuators for actuating the airbag are controlled with these signals, e.g. gas generators, the activators, e.g. comprising ignition units, in order to provide gas for inflating the airbags. The control unit is preferably integrated in the electrical system for the vehicle. Advantageously, the control unit is an electronic control unit for automatic driving functions. This means, in particular, that the control unit controls not only the airbags, but also other functions, e.g. longitudinal and/or lateral control of the vehicle. The computer evaluates the signals from the imaging sensor, preferably with artificial intelligence, e.g. artificial neural networks.

The method is preferably implemented with a computer. This means that all of the steps are executed by a computer, e.g. a computer in the control unit. The data provided by the QR code, e.g. manufacturer, model, or dimensions of the vehicle child seat, are preferably also taken into account in the computer implemented method.

The interior monitoring system according to the invention comprises at least one imaging sensor and an interface to a control unit for an airbag. The interior monitoring system executes the method according to the invention.

The interface is hard wired or wireless. In particular, the interface is configured for signal transfer by means of radio technology.

The imaging sensor of the interior monitoring system is preferably a 2D camera, 3D camera, radar sensor, and/or lidar sensor. The 2D camera is a mono-camera, for example. According to another embodiment of the invention, the 2D camera is a stereo camera, and thus forms a 3D camera. The 3D camera is preferably a time of flight camera, functioning in the infrared spectrum. The radar sensor comprises fewer transmitting and receiving antennas than radar sensors for detecting a vehicle environment, and can therefore be inexpensively produced as a relatively small component, and installed in a space-saving manner, as is also the case with a lidar sensor. The vehicle interior is scanned with the radar sensor and/or lidar sensor by means of radar and/or light pulses, in order to obtain a 2D or 3D representation of the vehicle interior. With the various sensor technologies, various advantages of the respective sensor technologies, e.g. regarding spatial and/or temporal resolutions, exposure times or latency periods, can be made use of as needed. Furthermore, images made with one sensor technology can be checked for plausibility with images made with another sensor technology.

The computer program according to the invention is used for the adaptive actuation of an airbag. The computer program comprises software code segments. The software code segments cause the interior monitoring system according to the invention to execute a method according to the invention when the computer program runs on a control unit for the airbag.

The software code segments of the computer program represent a sequence of commands, by means of which the control unit is caused, when the computer program is loaded, to adaptively actuate the airbag, comprising in particular a suppression of the actuation. The computer program therefore has a technological effect, and increases safety when vehicle child seats are used.

The computer program is stored on the computer readable data carrier according to the invention. By way of example, the control unit loads and executes the data carrier in memory modules of the computer. The data carrier is, e.g., a USB stick, SD card, advantageously an SD card with an integrated WLAN function, a CD, DVD, or Blu-ray Disc.

FIG. 1 shows an exemplary embodiment of the invention.

A vehicle child seat 2 is attached to a vehicle seat 4 facing the direction of travel. A marking object 1 is glued to an outer surface of the vehicle child seat 2. The marking object 2 is, e.g., a radar reflector.

The vehicle comprises an interior monitoring system 7. The interior monitoring system 7 comprises an imaging sensor 5, and an interface 8 to a control unit 6 for an airbag 3. The imaging sensor 5 is, e.g., a radar sensor.

The marking object 1 marks the position and orientation of the vehicle child seat 2. By way of example, the vehicle child seat 2 is positioned on a front passenger seat, facing the direction of travel. The imaging sensor 5 detects the position and orientation of the vehicle child seat 2 by means of the marking object 1, and outputs a corresponding image signal. The image signal is sent to an interface 8. The interface 8 is, e.g., a Bluetooth interface. The interface 8 is connected for signal transfer to the control unit 6 for the airbag 3. The control unit 6 actuates the airbag 3 depending on the position and/or orientation of the vehicle child seat 2, and the control unit 6 potentially suppresses an actuation of the airbag 3.

REFERENCE SYMBOLS 1 marking object
2 vehicle child seat
3 airbag
4 vehicle seat
5 imaging sensor
6 control unit
7 interior monitoring system
8 interface

The invention claimed is:

1. A non-transitory computer readable medium configured to store thereon a computer program for adaptive actuation of an airbag that, when executed by at least one processing device of an interior monitoring system, the interior monitoring system comprising at least one imaging sensor, at least one interface to a control unit for an airbag, and the control unit for the airbag, cause the interior monitoring system to perform a method comprising:

detecting, by the at least one imaging sensor, a marking object, wherein the marking object comprises at least one of a Quick Response code, a radar reflector, a lidar reflector, or an infrared reflector placed on the vehicle child seat, and wherein the marking object is configured to reflect electromagnetic radiation and mark at least one of a position or an orientation of the vehicle child seat in relation to a vehicle seat for at least one interior imaging sensor based on the reflection;

automatically determining the at least one of the position or the orientation of the vehicle child seat in relation to the vehicle seat using the marking object detected by the imaging sensor; and automatically determining whether to actuate, by the control unit, the airbag depending on the at least one of the position or the orientation of the vehicle child seat in relation to the vehicle seat.

2. The non-transitory computer readable medium of claim 1, wherein the marking object comprises a Quick Response code.

3. A method for determining at least one of a position or an orientation of a vehicle child seat in relation to a vehicle seat, the method comprising:

placing a marking object on the vehicle child seat, wherein the marking object comprises at least one of a Quick Response code, a radar reflector, a lidar reflector, or an infrared reflector, and wherein the marking object is configured to reflect electromagnetic radiation and mark the at least one of the position or the orientation of the vehicle child seat in relation to the vehicle seat for at least one interior imaging sensor based on the reflection;

detecting, by the at least one interior imaging sensor, the marking object on the vehicle child seat;

automatically determining, by at least one computing device, the at least one of the position or the orientation of the vehicle child seat in relation to the vehicle seat using the marking object detected by the at least one interior imaging sensor;

and automatically determining, by the at least one computing device, whether to actuate an airbag depending on the at least one of the position or the orientation of the vehicle child seat in relation to the vehicle seat.

4. The non-transitory computer readable medium of claim 1, wherein the computer program, when executed by the at least one processing device, cause the interior monitoring system to perform the method further comprising:

automatically determining to suppress actuation, by the control unit, of the airbag based on the at least one of the position or the orientation of the vehicle child seat in relation to the vehicle seat.

5. An interior monitoring system comprising:

at least one imaging sensor configured to:

detect a marking object placed on a vehicle child seat;

wherein the marking object comprises at least one of a Quick Response code, a radar reflector, a lidar reflector, or an infrared reflector placed on the vehicle child seat, and wherein the marking object is configured to reflect electromagnetic radiation and mark at least one of a position or an orientation of the vehicle child seat in relation to a vehicle seat for the at least one imaging sensor based on the reflection;

at least one computing device configured to:

automatically determine the at least one of the position or the orientation of the vehicle child seat in relation to the vehicle seat using the marking object detected by the imaging sensor; and automatically determine whether to actuate an airbag depending on the at least one of the position or the orientation of the vehicle child seat in relation to the vehicle seat.

6. The interior monitoring system according to claim 5, wherein the imaging sensor comprises at least one of a 2D camera, a 3D camera, a radar sensor, or a lidar sensor.

7. The interior monitoring system according to claim 5, wherein the marking object comprises a Quick Response code.

8. The interior monitoring system according to claim 5, wherein the at least computing device is further configured to:

automatically determine to suppress actuation of the airbag based on the at least one of the position or the orientation of the vehicle child seat in relation to the vehicle seat.

9. The method according to claim 3, wherein the marking object comprises a Quick Response code.

10. The method according to claim 3, further comprising:

automatically determining, by the at least one computing device, to suppress actuation of the airbag based on the at least one of the position or the orientation of the vehicle child seat in relation to the vehicle seat.

\* \* \* \* \*